UNITED STATES PATENT OFFICE.

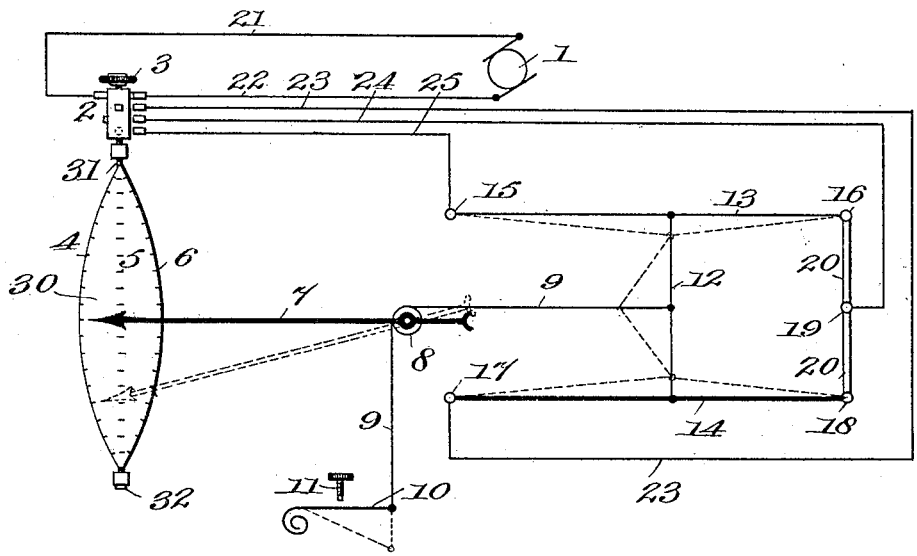

CLIFFORD D. BABCOCK, OF NEW YORK, N. Y., ASSIGNOR TO THE UNITED WIRELESS TELEGRAPH CO., OF NEW YORK, N. Y., A CORPORATION OF MAINE.

THERMO-EXPANSION METER.

No. 926,536.     Specification of Letters Patent.     Patented June 29, 1909.

Application filed May 21, 1908. Serial No. 434,143.

*To all whom it may concern:*

Be it known that I, CLIFFORD D. BABCOCK, a citizen of the United States, residing at New York, in the county of New York and State of New York, have invented certain new and useful Improvements in Thermo-Expansion Meters; and I do hereby declare the following to be a full, clear, and exact description of the invention, such as will enable others skilled in the art to which it appertains to make and use the same.

My invention relates to a multiple range thermo-expansion meter, and has for its object the production of a hot wire current meter which will be more efficient than those heretofore proposed, and which will be capable of a much greater range.

With these objects in view, my invention consists in the novel combination of parts more fully hereinafter disclosed and particularly pointed out in the claims.

Referring to the accompanying drawings forming a part of this specification in which like numerals refer to like parts in all the views:—Figure 1, is a diagrammatic view of my thermo-expansion meter showing the multiple scale. Fig. 2, a diagram of a switch connection when only one hot wire is in circuit. Fig. 3, a diagram of a switch when the other hot wire is in circuit. Fig. 4, a diagram of another switch connection when both hot wires are joined in series, and Fig. 5, still another diagram of a switch connection showing the hot wires joined in parallel.

1, indicates the source of the current to be measured; 2, a suitable switch in circuit therewith; 3, a suitable means for turning said switch; and 4, 5 and 6, different scales on the scale support 30, rigid with the turning means 3, and provided with the trunnions 31 and 32, which scales are successively turned into operative positions with respect to the pointer 7, when the switch is turned. The pointer 7, is mounted on the pivot 8, around which passes the filament 9, which is secured at one end to the spring 10, controlled by the adjustable screw 11, and at the other end to the non-conducting filament 12, whose ends are attached to the expansion measuring wires 13 and 14 respectively. The wire 13 is secured between the posts 15 and 16, and the wire 14 between the posts 17 and 18.

19, represents a post joined to the posts 16 and 18 by the connections 20. 23, 24 and 25 represent suitable wires joining these posts to the switch 2; and 21 and 22 wires leading from the source of current to said switch as shown.

There are four scales on the scale support 30, of which only three are shown, and each is struck from the pivot 8 as a center. The said scale support is preferably of the double conical or lozenge shape shown, but of course may be made of any form and provided with any supports desired.

The particular details of the switch are not illustrated, as the same do not constitute a part of the present invention, but any suitable switch may be employed, which will make the connections diagrammatically illustrated in Figs. 2, 3, 4 and 5, and at the same time bring the proper scale into position in relation to the pointer 7. That is to say, any switch may be employed which, when turned to one position, will cut out the measuring expansion wire 14, and include only the measuring wire 13 in circuit, as shown in Fig. 2; which, when turned to another position, will exclude the wire 13 and include only the wire 14 in the circuit, as shown in Fig. 3; which, when turned to a third position, will join both of the wires 13 and 14 in circuit in series, as shown in Fig. 4; and which, when turned to a fourth position, will join both of said wires in circuit in parallel, as shown in Fig. 5, provided the proper scale is brought into its proper relation with the pointer at each connection.

The expansion wires 13 and 14 may be of the same cross sectional area or of different cross sectional areas, as desired; and they may have the same or different coefficients of expansion.

The operation of my thermo-expansion meter is as follows:—The instrument having been carefully calibrated, under standard conditions, and with the use of known currents, the scales will indicate the value of the currents passing through the wires 13 and 14 for each of the connections disclosed. So when an unknown current is to be measured, the switch is turned until a scale is brought into the position relative to the pointer shown in Fig. 1. The wire 13 or 14, or both, according to the particular connection made, will then grow hot, expand in length, and buckle to a greater or less degree, as shown in dotted lines, Fig. 1. The tension of the spring 10, through the filament 9, will take up the slack thus formed in the filament 12;

and at the same time turn the pointer 7 on its pivot to a degree proportional to said slack, which in turn will depend for its value upon the degree of expansion of the particular expansion wire, or wires joined in the circuit. This expansion will likewise in turn depend upon the current passing through said wire or wires, and since the scales have been empirically marked for known currents, as above stated, the deflection of the pointer 7 on the scale corresponding to the particular connections made by the switch will indicate the value of the current that is passing. It will thus be seen that by employing two expansion wires, I am enabled to get four ranges of readings instead of one, as would be the case if only a single wire was used.

Of course I do not wish to be limited to the exact operation and details of construction above disclosed, since it is obvious that those skilled in the art may vary both without departing from the spirit of my invention.

What I claim is:—

1. In a hot wire current meter, the combination of a plurality of expansion elements; a switch adapted in one position to close a circuit through one of said elements, and in another position to close a circuit through another of said elements; a pointer; and a scale for each of said circuits with which said pointer coacts, substantially as described.

2. In a hot wire current meter, the combination of a plurality of expansion elements; a switch adapted to close two circuits each of which contains one of said elements and also to close a third circuit containing both the elements of said first mentioned circuits; a pointer; and a scale for each of said circuits, adapted to be moved by said switch into coöperative relation with said pointer, substantially as described.

3. In a hot wire current meter, the combination of a plurality of expansion elements which are adapted to form portions at different times of different circuits; a switch adapted to close three of said circuits and also to close a fourth circuit including a plurality of said elements in parallel; a scale support rigid with said switch adapted to be moved thereby and provided with a different scale for each of said circuits; and a pointer controlled by the expansion of said elements adapted to play over each of said scales, substantially as described.

4. In a hot wire current meter, the combination of a plurality of expansion elements; a switch adapted in one position to close a circuit through one of said elements, and in another position to close a circuit through another of said elements; a pointer; a scale for each of said circuits with which said pointer coacts, a filament connecting said elements a second filament connecting the first filament and a pivot for said pointer over which said second filament plays, substantially as described.

5. In a hot wire current meter, the combination of a plurality of expansion elements; a switch adapted to close two circuits each of which contains one of said elements and also to close a third circuit containing both the elements of said first mentioned circuits; a pointer; a scale for each of said circuits adapted to be moved by said switch into coöperative relation with said pointer, a filament connecting said elements; a second filament connecting the first filament and a pivot for said pointer over which said second filament plays, substantially as described.

6. In a hot wire current meter, the combination of a plurality of expansion elements which are adapted to form portions at different times of different circuits; a switch adapted to close three of said circuits and also to close a fourth circuit including a plurality of said elements in parallel; a scale support rigid with said switch adapted to be moved thereby and provided with a different scale for each of said circuits; a pointer controlled by the expansion of said elements adapted to play over each of said scales, a filament connecting said elements; a second filament connecting the first filament and a pivot for said pointer over which said second filament plays, substantially as described.

7. In a hot wire current meter, the combination of a plurality of expansion elements adapted at different times to be joined in different circuits, a filament connecting said elements; a second filament connected with the first filament; a pivot over which said second filament plays; a pointer on said pivot; a rotary switch for including said elements in different relations in said circuits; a scale support, rigid with said switch, carrying a plurality of scales, one for each circuit, provided with trunnions; a spring constantly tending to pull said second filament over said pivot and a screw for adjusting the tension of said spring, substantially as described.

In testimony whereof, I affix my signature, in presence of two witnesses.

CLIFFORD D. BABCOCK.

Witnesses:
MOSES ELY,
JOSEPH S. HUNT.